3,514,278
SLIME CONTROL AGENT AND METHODS
OF APPLICATION
Robert H. Brink, Jr., Swarthmore, Pa., assignor to Betz Laboratories, Inc., Trevose, Pa., a corporation of Pennsylvania
No Drawing. Filed Jan. 8, 1968, Ser. No. 696,153
Int. Cl. A01n 9/00
U.S. Cl. 71—67    5 Claims

ABSTRACT OF THE DISCLOSURE

The present invention concerns a biocidal composition comprising tertiary butyl hydroperoxide and its use as a biocide, and particularly concerns the control of industrial slimes caused by microorganisms with tertiary butyl hydroperoxide. In addition, the invention concerns the use of biocidal materials which do not contribute to the pollution of streams or bodies of water into which industrial effluents containing the biocidal material may be dumped or disposed of. The invention also concerns the use of peroxidic biocides which avoid many of the hazards commonly associated with the use, storage and handling of this type of compound.

BACKGROUND OF THE INVENTION

Industrial systems such as cooling water systems and paper and pulp mills are commonly plagued by slime formed by microorganisms such as bacteria, fungi and algae. Such slime produces fouling deposits which impair the efficiency of cooling systems. For example, the slime deposits may be carried through cooling systems to create stoppages or to deposit on heat exchange surfaces and thereby impair heat transfer. In addition, slime growths on wooden elements of cooling towers such as louvers and supports may cause the deterioration of the wood as well as promoting corrosion in the case of deposition on metal elements. In the case of paper mill systems, slime deposits are commonly carried to the paper forming section to yield unsightly blemishes which result in the rejection of the product, or to cause breakouts of the paper being formed with consequent work stoppages.

In controlling the foregoing slimes, a variety of biocidal agents are presently employed such as sodium chlorophenate and similar phenates, the mercurial compounds, etc. Such agents provide satisfactory control of the problem of slime formation, but in some instances contribute to the pollution of the public water supply which is presently a matter of major national concern. Specifically, some industries as the result of the large quantities of effluent disposed of, or because of the recirculation of process effluent and the resultant concentration of the quantity of biocide contained by the final effluent, add appreciable quantities of such biocides to public and private water supplies. In recognition of this problem, a number of state and local authorities have drastically limited the quantities or levels of such biocides which may be added to public water supplies and similar, more comprehensive federal legislation is in progress. The observation of such restrictions by industry will result in less efficient slime control and an attendant loss in processing efficiency unless improved techniques and materials are devised.

The use of biocidal or biostatic slime control agents which do not contribute to pollution such as chlorine and hydrogen peroxide has been previously considered. However, the effectiveness of chlorine is limited by the fact that the chlorine demand of the system treated commonly results in situations in which the chlorine is expended without yielding an appreciable biocidal effect. Similarly, hydrogen peroxide exerts a limited biocidal effect, is highly toxic to humans in concentrated form and general possesses an extremely hazardous nature. The latter aspect creates extensive problems in the shipping, storage and use of hydrogen peroxide and necessitates expensive and laborious safety procedures.

It is an object of the present invention to provide biocidal materials and methods which are effective in controlling the formation of slimes formed by microorganisms, but which do not contribute to pollution by providing undesirable constituents of the effluent from processes treated with these materials and methods.

This and other objects will become apparent from an examination of the present specification and claims, and are achieved by means of tertiary butyl hydroperoxide which has the structural chemical formula:

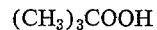

$$(CH_3)_3COOH$$

Tertiary butyl hydroperoxide is a commercially available material which may be prepared from tertiary butyl alcohol and hydrogen peroxide in the presence of sulfuric acid as disclosed by U.S. Pat. 2,573,947, or by the means of the oxidation of tertiary butyl magnesium chloride as disclosed by Walding and Buckler [J. Am. Chem. Soc., 75,4372 (1953) and 77,6032 (1955)].

Tertiary butyl hydroperoxide is a liquid which is stable and insensitive to shock at temperatures as high as 170° F. and has a flash point of 135° F. Consequently, it presents no hazards in the environments of intended use since such conditions are not experienced in slime control practiced in paper and pulp mill and cooling water systems. In this regard, it is highly unlike hydrogen peroxide which is fire and explosion prone at commonly experienced conditions and highly toxic to humans.

As previously stated, the tertiary butyl hydroperoxide is substantially innocuous per se in respect to the pollution of public water supplies. In addition, in the event that this compound should constitute an undesirable constituent of effluent in rare and presently unpredictable circumstances, it may be readily and simply converted to an even less harmful form. Specifically, tertiary butyl hydroperoxide is easily converted to the corresponding alcohol and hydrogen peroxide in the presence of alkaline conditions and the effluent may be treated with a material such as sodium hydroxide in order to achieve such a conversion. In some cases, the medium into which the effluent is dumped for disposal may be attended by alkaline conditions adequate to bring about the conversion without the need for such treatment. In any event, such alcohols and hydrogen peroxide do not present pollution problems in the quantities involved in paper mill and cooling water applications. Or, similarly, the tertiary butyl hydroperoxide containing waste stream may be treated with sodium sulfite to yield the tertiary butyl alcohol and acetone.

The inventive compositions may be added to the cooling water or paper mill systems at any convenient point. Naturally, in once-through or non-recirculating systems the biocide must be added to the system upstream from the point or points at which microorganism control is desired. In recirculating systems the biocides may be added at any point, provided that the time lapse, and conditions experienced, between the point of addition and the point at which the effect of the biocide is experienced are not so drastic as to result in the neutralization of the biocidal effect.

The tertiary butyl hydroperoxide may be combined with a number of diluents or carriers such as tertiary butyl alcohol, isopropyl alcohol, and acetone when a dilute feed system is desired. A preferred diluent is isopropyl alcohol.

The tertiary butyl hydroperoxide should be employed in quantities of from 1 to 1000 parts by weight for each one million parts by weight of the system to be treated, e.g. each one million parts by weight of water contained by the cooling system to be treated. A treatment level of from 25 to 50 parts per million is preferred.

The bactericidal effect of the inventive materials and methods is demonstrated by Table 1 in which the inhibiting power of a number of conventional industrial biocides are contrasted with those of tertiary butyl hydroperoxide. In the test which provided the data embodied in Table 1, *Aerobacter aerogenes* was employed as the test organism and a substrate technique was utilized. Specifically, each of the biocidal agents was added in gradually increasing quantities to nutrient media which were then inoculated with *A. aerogenes*, until no growth resulted after a 48 hour incubation period. The values set forth indicate the quantity of each biocide which was required in parts by weight for each one million parts by weight of the nutrient medium, in order to achieve complete inhibition of the growth of the test organism.

TABLE 1

| Biocidal material | Quantity (p.p.m.) required for inhibition of *A. Aerogenes* |
|---|---|
| Tertiary butyl hydroperoxide | 70 |
| Coco-1,3-proplyene adipate | 100 |
| Acrolein | 150 |
| Sodium pentachlorophenate | 250 |
| 2,3,4,6-tertrachlorophenol | 400 |

On the basis of the foregoing data, it may be observed that the biocidal activity of the inventive methods and materials permitted reductions of between 30 to 83% in the quantity of biocide required for inhibition.

The efficacy of the inventive materials and methods in respect to anaerobic bacteria was also tested in relation to *Desulfovibrio desulfuricans*, a sulfate reducing microorganism. The test employed approximated that of Example 1 except in respect to the nutrient medium used and the imposition of anaerobic conditions, and the results achieved are set forth in Table 2.

TABLE 2

| Biocidal material | Quantity (p.p.m.) required for inhibition of *D. desulfuricans* |
|---|---|
| Tertiary butyl hydroperoxide | 100 |
| Alkyl ($C_{9-15}$) tolyl methyl trimethyl ammonium chloride | 100 |
| Coco-1,3-propylene adipate | 100 |

In order to test the effectiveness of the inventive compound in respect to fungi, tests similar to those of Table 1 were conducted with *Penicillum expansum* to yield the results set forth in Table 3.

TABLE 3

| Biocidal material | Quantity (p.p.m.) required for inhibition of *P. Expansum* |
|---|---|
| Tertiary butyl hydroperoxide | 500 |
| n-Alkyl ($C_{12-14}$) dimethyl benzyl ammonium chloride | 1,600 |
| Alkyl ($C_{9-15}$) tolyl methyl trimethyl ammonium chloride | 1,500 |
| Coco-1, 3-propylene adipate | 1,500 |

A test of the effectiveness of the inventive compound in respect to algae was also conducted in a manner similar to that of Table 1 with the exception that the algae, *Euglena gricilis*, were admixed with the nutrient medium as opposed to the innoculation of the medium. The results of this test are set forth in Table 4.

TABLE 4

| Biocidal material | Quantity (p.p.m.) required for the inhibition of *E. Gracilis* |
|---|---|
| Tertiary butyl hydroperoxide | 100 |
| Dimethyl dithiocarbamate (sodium salt) | 280 |
| 2,2'-thiobis (4,6-dichlorophenol) | 200 |

The inventive methods and materials were also tested in respect to their performance in the control of slime formation in industrial systems. The results of these studies are set forth in Tables 5 and 6. In these tests paper mill white water samples and cooling water samples were obtained from paper mill and cooling water systems which were currently experiencing problems in respect to the formation of slime by microorganisms. Such tests do not demonstrate the efficiency of the biocides employed in respect to specific species of microorganisms but instead supply a practical demonstration of the efficacy of the biocide tested in relation to those communities of microorganisms which have evidenced their ability to form slime in actual industrial systems.

In the testing of the paper mill white water samples shown by Table 5, a Gilson Respirometer evaluation was employed. In such testing, the oxygen uptake from the samples is measured in systems with and without the biocide to be tested. The reduction in oxygen uptake experienced in the systems containing the biocide is expressed as the percentage of inhibition yielded by the biocide. In Table 5, sample A was taken from the headbox of a paper making system in the southeastern U.S. and sample B was taken from the headbox of a machine located in a mill in the eastern United States.

TABLE 5

| Sample | Biocide Tested | Quantity of biocide (p.p.m.) | Percentage of inhibition |
|---|---|---|---|
| A | Tertiary butyl hydroperoxide | 3 | 42.1 |
|   |   | 6 | 77.4 |
|   | Sodium salt of dimethyl dithiocarbamate | 3 | 62.3 |
|   |   | 6 | 49.5 |
| B | Tertiary butyl hydroperoxide | 5 | 11.3 |
|   |   | 10 | 24.8 |
|   | Hydrogen peroxide | 4.5 | 0.66 |
|   |   | 7.5 | 2.2 |
|   | Sodium pentachlorophenate | 5 | 3.9 |
|   |   | 10 | 4.4 |
|   | n-Alkyl ($C_{12-14}$) dimethyl benzyl ammonium chloride | 5 | 4.6 |
|   |   | 10 | 20.8 |

As may be observed, the inventive methods yielded results superior to those yielded by conventional commercial biocides and hydrogen peroxide in respect to the control of slime-forming microorganisms in paper mill water.

In the testing of contaminated cooling water samples which is shown by Table 6, a substrata evaluation was employed. In such testing identical quantities of water samples are added to equal quantities of the nutrient media which contain varying quantities of the biocide to be tested. The substrates are then incubated for a period of 48 hours and the microorganisms which develop on the substrate are counted. The counts derived from the substrates which contain a biocide are then compared with a control substrate which is devoid of a biocide to yield a percentage kill value. Both of the cooling water samples were taken from systems plagued by slimes and sample A was selected from a cooling tower in the eastern U.S. while sample B was taken from a cooling tower in Mexico. In those kills which are expressed as a negative value, the microorganisms actually flourished despite the presence of the biocide.

TABLE 6

| Sample | Biocide Tested | Quantity of biocide (p.p.m.) | Percentage kill |
|---|---|---|---|
| A | Tertiary butyl hydroperoxide | 5 | 36.4 |
|   |   | 10 | 64.5 |
|   | Sodium pentachlorophenate | 5 | −29.0 |
|   |   | 10 | 3.3 |
| B | Tertiary butyl hydroperoxide | 25 | 70.7 |
|   | Sodium pentachlorophenate | 25 | 26.2 |

It is again apparent that the inventive methods yielded results superior to those yielded by conventional commercial biocides in respect to the control of slime-forming microorganisms in cooling water.

As may be observed on the basis of the foregoing data, the inventive methods and materials provide biocidal activity which is comparable or superior to presently employed biocides. At the same time, these highly satisfactory results are achieved without contributing to, and in fact while diminishing, the problem of the pollution of our national water supplies. In addition, the inventive methods and materials provide a peroxide biocide which avoids or reduces the hazards experienced in the storage, handling and use of hydrogen peroxide, i.e. explosion, fire and toxicity hazards.

It is believed that the present invention provides highly desirable methods and materials for the control of microorganisms in paper-mill and cooling water systems while simultaneously providing improvements and benefits in respect to pollution control and the reduction of hazards. It is further believed that various changes, alterations, substitutions and modifications may be made in the present invention without departing from the spirit of the invention as defined by the following claims.

I claim:
1. A method for controlling the formation of slime formed by microorganisms contained in cooling water and paper and pulp mill systems by inhibiting the growth of said microorganisms which comprises adding to said system a sufficient amount of tertiary butylhydroperoxide to effectively control the growth of said microorganisms.
2. A method as claimed by claim 1 wherein said tertiary butylhydroperoxide is added to said systems in a quantity of from 1 to 1,000 parts by weight for each one million parts by weight of the aqueous medium contained in said systems.
3. A method as claimed by claim 2 wherein said tertiary butylhydroperoxide is added in an amount of from about 25 to about 50 parts by weight for each one million parts by weight of said aqueous medium.
4. A method according to claim 3 wherein said system is a cooling water system.
5. A method according to claim 3 wherein said system is a paper and pulp mill system.

References Cited

UNITED STATES PATENTS

| | | | |
|---|---|---|---|
| 2,020,648 | 11/1935 | Hyman | 424—338 |
| 3,029,202 | 4/1962 | Brown | 210—63 |
| 3,300,373 | 1/1967 | Wolfson | 71—67 |
| 2,576,442 | 11/1951 | Borglin et al. | 210—64 |
| 2,657,125 | 10/1953 | Goodhue et al. | 71—79 |
| 2,692,231 | 10/1954 | Stayner et al. | 210—64 |
| 2,970,081 | 1/1961 | McCall et al. | 424—338 |
| 3,282,702 | 11/1966 | Schreiner | 210—64 |

FOREIGN PATENTS 17,677  11/1965  Japan.

OTHER REFERENCES

Lee et al., Survey of amino acid paper chromatograms and the effects of 2,4–D on the respiration and growth of Euglena. (1959) CA54 pp. 688–89 (1960).

Haagen-Smit, "Investigation on injury to plants etc.," (1952) CA46 p. 3704 (1952).

Goodenough, "Iodine-peroxide-bisulfate etc.," (1963) CA65 p. 1962 (1966).

Armitage et al., "Safety considerations etc.," (1964) CA62 pp. 2701–02 (1965).

Noller et al., "A relative hazard etc.," (1964) CA62 pp. 3874–75 (1965).

Kirchner, "The effects of the mutata gene etc.," (1960) CA55 pp. 9553–54 (1961).

Updegraff et al., "Reduction of Organic etc.," (1958) CA55 p. 7502 (1961).

Vilenskaya et al., "Surface-active properties etc.," (1966) CA65 p. 9184 (1966).

LEWIS GOTTS, Primary Examiner

G. HOLLRAH, Assistant Examiner

U.S. Cl. X.R.

71—79; 162—78, 190; 210—64; 424—338